US008217991B2

(12) United States Patent
Mashitani et al.

(10) Patent No.: US 8,217,991 B2
(45) Date of Patent: Jul. 10, 2012

(54) METHOD, DEVICE AND PROGRAM FOR PROCESSING STEREOSCOPIC IMAGES AND RECORDING MEDIUM STORING THE PROGRAM

(75) Inventors: Ken Mashitani, Osaka (JP); Toshio Nomura, Tokyo (JP); Tadashi Uchiumi, Chiba (JP); Hidehiko Sekizawa, Tokyo (JP); Hideaki Yoshida, Tokyo (JP)

(73) Assignees: Sanyo Electric Co., Ltd., Osaka (JP); Sony Corporation, Tokyo (JP); Sharp Kabushiki Kaisha, Osaka (JP); Olympus Imaging Corp., Tokyo (JP)

( * ) Notice: Subject to any disclaimer, the term of this patent is extended or adjusted under 35 U.S.C. 154(b) by 1217 days.

(21) Appl. No.: 11/988,032

(22) PCT Filed: Jul. 4, 2006

(86) PCT No.: PCT/JP2006/313281
§ 371 (c)(1),
(2), (4) Date: Dec. 28, 2007

(87) PCT Pub. No.: WO2007/004633
PCT Pub. Date: Jan. 11, 2007

(65) Prior Publication Data
US 2009/0109281 A1    Apr. 30, 2009

(30) Foreign Application Priority Data

Jul. 5, 2005  (JP) ................................. 2005-196459
Jul. 5, 2005  (JP) ................................. 2005-196460

(51) Int. Cl.
*H04N 15/00* (2006.01)
*H04N 13/00* (2006.01)
(52) U.S. Cl. ........ 348/43; 348/42; 348/469; 375/240.02

(58) Field of Classification Search ........................ None
See application file for complete search history.

(56) References Cited

U.S. PATENT DOCUMENTS 6,043,838 A * 3/2000 Chen .............................. 348/42
(Continued)

FOREIGN PATENT DOCUMENTS

CN    1226786 A    8/1999
(Continued)

OTHER PUBLICATIONS

Chinese Office Action, w/ English translation thereof, issued in Chinese Patent Application No. CN 200680023999.5 dated May 25, 2010.

(Continued)

*Primary Examiner* — Jeffrey R Swearingen
(74) *Attorney, Agent, or Firm* — McDermott Will & Emery LLP (57) ABSTRACT

A stereoscopic image processing method capable of preventing occurrence of undesirable cutout of image when a stereoscopic combined image is printed out is provided.

A stereoscopic combined image can be created and recorded using a digital still camera 1. This stereoscopic combined image is a single image formed by arranging a plurality of view-point images. At first, left view-point image data and right view-point image data are stored in a memory by performing photographing twice. Then, the data of the two images are arranged laterally into a single image. Through this processing, original stereoscopic combined image data is created. Padding areas (dummy areas) are added to the original stereoscopic combined image data at the upper and lower sides thereof. Namely, a processed image containing the original stereoscopic combined image is created.

22 Claims, 8 Drawing Sheets

U.S. PATENT DOCUMENTS

| | | | |
|---|---|---|---|
| 6,937,763 B2 * | 8/2005 | Koike et al. | 348/169 |
| 7,636,088 B2 * | 12/2009 | Nomura et al. | 345/419 |
| 2002/0056083 A1 | 5/2002 | Istvan | |
| 2002/0136432 A1 | 9/2002 | Koike et al. | |
| 2005/0093893 A1 | 5/2005 | Senior et al. | |

FOREIGN PATENT DOCUMENTS

| | | |
|---|---|---|
| JP | 2002-218501 | 8/2002 |
| JP | 2004-208255 | 7/2004 |
| JP | 2004-274253 | 9/2004 |
| JP | 2004-343549 | 12/2004 |
| JP | 2004-356997 | 12/2004 |
| JP | 2005-78424 | 3/2005 |
| JP | 2005-130313 | 5/2005 |
| JP | 2005-311985 | 11/2005 |
| JP | 2006-303937 | 11/2006 |

OTHER PUBLICATIONS

Japanese Notification of Reason(s) for Refusal, w/ English translation thereof, issued in Japanese Patent Application No. JP 2005-196460 dated Nov. 24, 2010.

Japanese Notification of Reasons for Refusal issued in Japanese Patent Application No. JP 2005-196459 dated Aug. 17, 2010.

Japanese Notification of Reasons for Refusal issued in Japanese Patent Application No. JP 2005-196460 dated Aug. 17, 2010.

Chinese Office Action, and English translation thereof, issued in Chinese Patent Application No. 201010541554.4, dated Jan. 29, 2012.

* cited by examiner

FIG. 1

FIG. 2A  LEFT VIEW-POINT IMAGE      RIGHT VIEW-POINT IMAGE

COMBINE

FIG. 2B

PADDING

FIG. 4A  LEFT VIEW-POINT IMAGE     RIGHT VIEW-POINT IMAGE

COMBINE

FIG. 4B

PADDING

ASPECT RATIO OF ORIGINAL IMAGE

AREA WHICH INCLUDES R VIEW-POINT IMAGE BUT IS UNUSABLE
SINCE L VIEW-POINT IMAGE IS SUBJECTED TO TRIMMING $y=(x-1.33)/2$
$z=x/2-2*y=1.33-x/2$
RATE OF 3D VIEW-FIELD$=z/(x/2)=(2.66/x)-1$
$=0.773$ $(x=1.5)$

AREA INTO WHICH R VIEW-POINT IMAGE DIRECTLY PROTRUDES
(AREA WHICH IS EVENTUALLY SUBJECTED TO TRIMMING)

METHOD, DEVICE AND PROGRAM FOR PROCESSING STEREOSCOPIC IMAGES AND RECORDING MEDIUM STORING THE PROGRAM

RELATED APPLICATIONS

This application is the U.S. National Phase under 35 U.S.C. §371 of International Application No. PCT/JP2006/313281, filed on Jul. 4, 2006, which in turn claims the benefit of Japanese Application Nos. 2005-196459 and 2005-196460, both filed on Jul. 5, 2005, the disclosures of which Applications are incorporated by reference herein.

TECHNICAL FIELD

The present invention relates to methods, devices and programs for processing stereoscopic images and recording media storing the programs.

BACKGROUND ART

Conventionally, creation of a single stereoscopic combined image by laterally arranging two parallax images (a right view-point image and a left view-point image) has been performed, on the basis of methods such as a so-called parallel method and a so-called cross method. It is possible to perform stereoscopic viewing by viewing, with both eyes, the stereoscopic combined image displayed on a display or the stereoscopic combined image which has been printed out (refer to Patent Document 1).

Patent Document 1: JP-A No. 2005-78424

DISCLOSURE OF THE INVENTION

Problems to be Solved by the Invention

However, when the two parallax images have an aspect ratio of 4 (horizontal size):3 (vertical size), for example, the stereoscopic combined image has an aspect ratio of 8:3. When the stereoscopic combined image having this aspect ratio is printed out on a printing sheet having an aspect ratio of 4:3, for example, or displayed on a display having an aspect ratio of 4:3, the stereoscopic combined image is displayed or printed out as an image undesirable for stereoscopic viewing.

Figure 9:
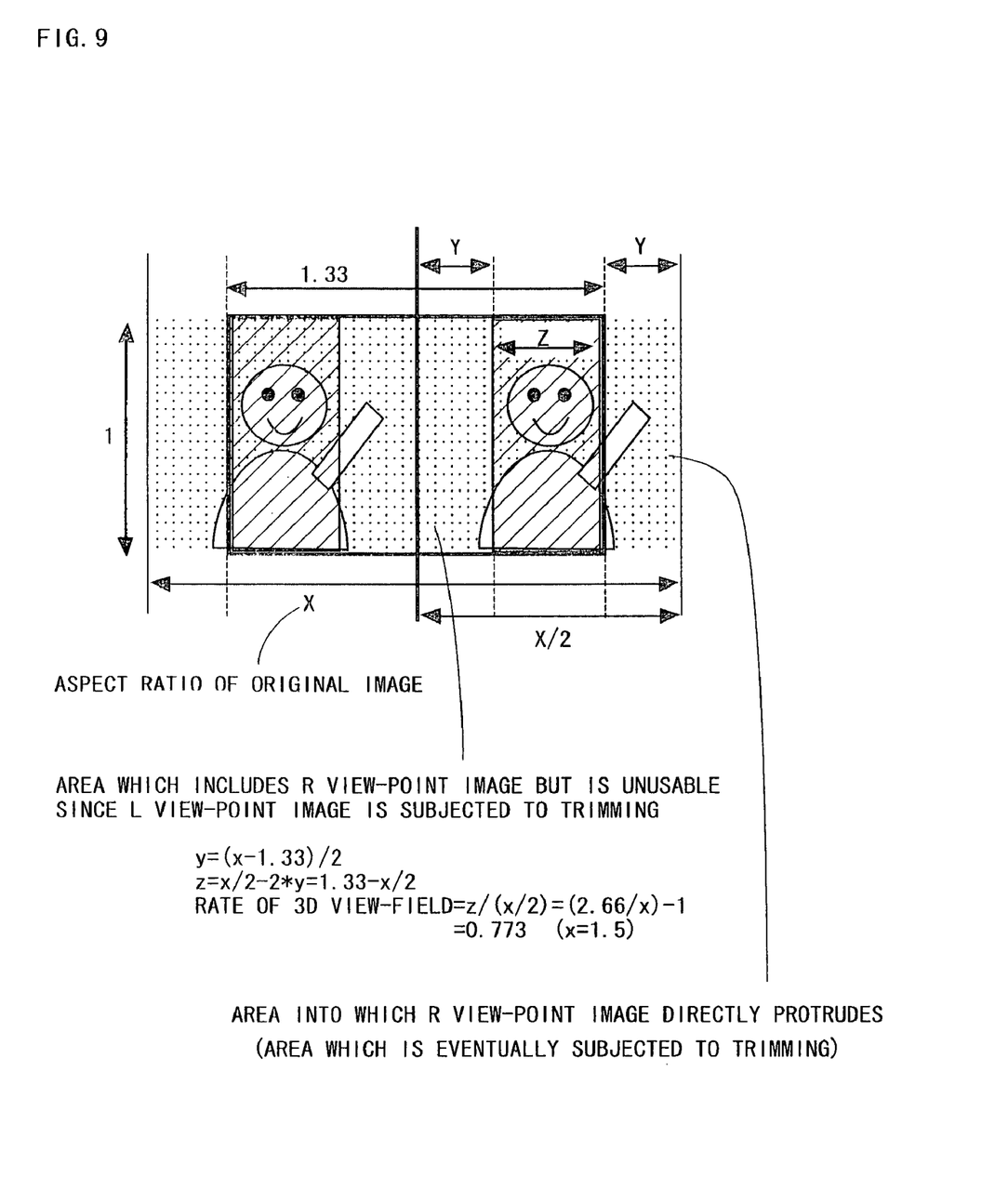
FIG. 9 is a schematic diagram illustrating the relationship between a stereoscopic combined image and a printing range.

More specifically, when the printing range has an aspect ratio of 4:3 (1.33:1) and a stereoscopic combined image constituted by two parallax images protrudes from the printing range at its horizontal width, as illustrated in FIG. 9, there will be generated, in the area of the right view-point image, an area which actually protrudes from the printing range (an area which is eventually subjected to trimming) and an area which is within the printing range but is unusable for stereoscopic viewing due to the actual protrusion of the left view-point image from the printing range. A similar phenomenon occurs in the area of the left view-point image, which significantly reduce the area usable for stereoscopic viewing.

In view of the aforementioned circumstances, it is an object of the present invention to provide a stereoscopic image processing method, device and program which are capable of preventing the occurrence of undesirable cutout of images in cases where stereoscopic combined images are printed out and the like, and also to provide a recording medium storing the program.

Thus, in view of the fact that there are cases where the apparatus which receives the stereoscopic combined image is an apparatus which is not adaptable to three dimensional (3D) images, the applicants propose herein adding a padding area having any color and/or any pattern to the stereoscopic combined image to create a processed image containing the stereoscopic combined image. On the other hand, in the case where the apparatus which receives the stereoscopic combined image is an apparatus adaptable to 3D images, the padding area may become unnecessary areas. Further, there are cases where an additional image constituted by characters describing "3D" or "Parallel Method" is superimposed on the stereoscopic combined image at a non-center portion thereof to create a processed image constituted by the stereoscopic combined image and the additional image contained in the stereoscopic combined image. In these cases, similarly, the additional image constituted by the characters indicative of the description becomes an unnecessary area for the 3D-adaptable apparatus.

The present invention further enables extraction of a stereoscopic combined image when a processed image containing the stereoscopic combined image is received. Further, the present invention enables extraction of only the portion of a stereoscopic combined image, when a processed image constituted by the stereoscopic combined image and an additional image contained in the stereoscopic combined image generated by superimposing the additional image onto the stereoscopic combined image at a non-center portion thereof is received.

Means for Solving the Problems

A stereoscopic image processing method according to the present invention is a method for creating a single stereoscopic combined image formed by arranging a plurality of view-point images, the method including adding a padding area having at least one of any color and any pattern to an original stereoscopic combined image in such a way as to satisfy the condition of V1>V and also to satisfy the condition that the ratio between V1 and H1 falls within a predetermined ratio range, where the horizontal size and the vertical size of the original stereoscopic combined image are H and V, respectively, and the horizontal size and the vertical size of a processed image containing the stereoscopic combined image are H1 and V1, respectively (hereinafter referred to as a first method in this section).

Further, a stereoscopic image processing method according to the present invention is a method for creating a single stereoscopic combined image formed by arranging a plurality of view-point images, the method including adding a padding area having at least one of any color and any pattern to an original stereoscopic combined image such that the ratio between V1 and H1 becomes a predetermined ratio, where the horizontal size and the vertical size of the original stereoscopic combined image are H and V, respectively, and the horizontal size and the vertical size of a processed image containing the stereoscopic combined image are H1 and V1, respectively (hereinafter referred to as a second method in this section).

In the first and second methods, the single stereoscopic combined image formed by arranging a plurality of view-point images may be a single stereoscopic combined image formed by arranging a set of a right view-point image and a left view-point image which are arranged laterally. In these methods, the processing for adding the padding area may be performed in the case where the ratio between V and H does not satisfy a specified ratio.

In these methods, the predetermined ratio is preferably equal to or substantially equal to the ratio between the vertical size and the horizontal size of a printing sheet. It is also preferred that, in these methods, the predetermined ratio is equal to or substantially equal to the ratio between the vertical size and the horizontal size of a display.

A stereoscopic image processing device according to the present invention is a device for creating a single stereoscopic combined image formed by arranging a plurality of view-point images, the device including an image processing portion for adding a padding area having at least one of any color and any pattern to an original stereoscopic combined image in such a way as to satisfy the condition of V1>V and also to satisfy the condition that the ratio between V1 and H1 falls within a predetermined ratio range, where the horizontal size and the vertical size of the original stereoscopic combined image are H and V, respectively, and the horizontal size and the vertical size of a processed image containing the stereoscopic combined image are H1 and V1, respectively (hereinafter referred to as a first device in this section).

Further, a stereoscopic image processing device according to the present invention is a device for creating a single stereoscopic combined image formed by arranging a plurality of view-point images, the device including an image processing portion for adding a padding area having at least one of any color and any pattern to an original stereoscopic combined image such that the ratio between V1 and H1 becomes a predetermined ratio, where the horizontal size and the vertical size of the original stereoscopic combined image are H and V, respectively, and the horizontal size and the vertical size of a processed image containing the stereoscopic combined image are H1 and V1, respectively (hereinafter referred to as a second device in this section).

In the first and the second devices, the single stereoscopic combined image formed by arranging the plurality of view-point images may be a single stereoscopic combined image having a set of a right view-point image and a left view-point image which are laterally arranged. In these stereoscopic image processing devices, the processing for adding the padding area may be performed in the case where the ratio between V and H does not satisfy a specified ratio. In the stereoscopic image processing device with the above configuration, the case where the specified ratio is not satisfied may be the case where the condition of V/H≧2/3 is not satisfied.

In the stereoscopic image processing devices with the above configurations, the predetermined ratio is preferably equal to or substantially equal to the ratio between the vertical size and the horizontal size of a printing sheet. Also in the stereoscopic image processing devices with the above configurations, the predetermined ratio is preferably equal to or substantially equal to the ratio between the vertical size and the horizontal size of a display.

Further, a stereoscopic image processing method according to the present invention is a method for creating a single stereoscopic combined image having arranged plural view-point images, the method including the steps of: (a) adding a padding area having at least one of any color and any pattern to the stereoscopic combined image to create a processed image containing the stereoscopic combined image; (b) creating location information for use in extracting the stereoscopic combined image from the processed image; and (c) adding the location information to the processed image (hereinafter referred to as a third method in this section). With this method, the receiving side which received the processed image containing the stereoscopic combined image can extract only the stereoscopic combined image by utilizing the location information.

Further, a stereoscopic image processing method according to the present invention is a method for creating a single stereoscopic combined image formed by arranging the plurality of view-point images, the method including the steps of (a) superimposing an additional image on a non-center portion of the stereoscopic combined image to create a processed image including the stereoscopic combined image and the additional image contained in the stereoscopic combined image; (b) creating location information for use in extracting, from the processed image, the portion of the stereoscopic combined image which does not contain the additional image; and (c) adding the location information to the processed image (hereinafter referred to as a fourth method in this section). With this method, the receiving side which received the processed image constituted by the stereoscopic combined image and the additional image contained in the stereoscopic combined image generated by superimposing the additional image onto the stereoscopic combined image at a non-center portion thereof can extract only the portion of the stereoscopic combined image by utilizing the location information.

In the fourth method, the additional image may be an image having at least one of a character and a symbol indicating the fact that the stereoscopic combined image is a stereoscopic image. Also in the fourth method, the additional image may be an image having at least one of a character and a symbol indicating a method for stereoscopically viewing the stereoscopic combined image.

In the third and fourth methods and the method according to the fourth method, the single stereoscopic combined image formed by arranging a plurality of view-point images may be a single stereoscopic combined image having a set of a right view-point image and a left view-point image which are arranged laterally.

A stereoscopic image processing device according to the present invention is a device for creating a single stereoscopic combined image formed by arranging a plurality of view-point images, the device including: a first processing portion for adding a padding area having at least one of any color and any pattern to the stereoscopic combined image to create a processed image containing the stereoscopic combined image; a second processing portion for creating location information for use in extracting the stereoscopic combined image from the processed image; and a third processing portion for adding the location information to the processed image (hereinafter referred to as a third device in this section).

A stereoscopic image processing device according to the present invention is a device for creating a single stereoscopic combined image formed by arranging a plurality of view-point images, the device including: a first processing portion for superimposing an additional image on a non-center portion of the stereoscopic combined image to create a processed image including the stereoscopic combined image and the additional image contained in the stereoscopic combined image; a second processing portion for creating location information for use in extracting, from the processed image, the portion of the stereoscopic combined image which does not contain the additional image; and a third processing portion for adding the location information to the processed image (hereinafter referred to as a fourth device in this section).

In the fourth device, the additional image may be an image having at least one of a character and a symbol indicating the fact that the stereoscopic combined image is a stereoscopic image. Also in the fourth device, the additional image may be an image having at least one of a character and a symbol indicating a method for stereoscopically viewing the stereoscopic combined image.

In the third and fourth devices and the device according to the fourth device, the single stereoscopic combined image formed by arranging a plurality of view-point images may be a single stereoscopic combined image having a set of a right view-point image and a left view-point image which are arranged laterally.

A stereoscopic image processing method according to the present invention includes, when a received image is provided with information indicative of the fact that the image is a processed image created by adding a padding area having at least one of any color and any pattern to a single stereoscopic combined image formed by arranging a plurality of view-point images and the received image is also provided with location information for use in extracting the stereoscopic combined image from the processed image, extracting the stereoscopic combined image from the processed image using the location information (hereinafter referred to as a fifth method in this section).

A stereoscopic image processing method according to the present invention includes, when a received image is provided with information indicative of the fact that the image is a processed image constituted by a stereoscopic combined image formed by arranging a plurality of view-point images and an additional image contained in the stereoscopic combined image generated by superimposing the additional image onto the stereoscopic combined image at a non-center portion thereof and the received image is also provided with location information for use in extracting, from the processed image, the portion of the stereoscopic combined image which does not contain the additional image, extracting the portion of the stereoscopic combined image from the processed image using the location information (hereinafter referred to as a sixth method in this section).

In the fifth and sixth methods, the single stereoscopic combined image formed by arranging a plurality of view-point images may be a single stereoscopic combined image having a set of a right view-point image and a left view-point image which are arranged laterally. In these methods, a stereoscopic image may be created using the respective view-point images in the stereoscopic combined image or the portion of the stereoscopic combined image which has been extracted. Further in these methods, the respective view-point images in the stereoscopic combined image or the portion of the stereoscopic combined image which has been extracted may be displayed or printed out.

A stereoscopic image processing device according to the present invention is a device for processing a received image, the device including an image processing portion for, when the received image is provided with information indicative of the fact that the image is a processed image created by adding a padding area having at least one of any color and any pattern to a single stereoscopic combined image formed by arranging a plurality of view-point images and the received image is also provided with location information for use in extracting the stereoscopic combined image from the processed image, extracting the stereoscopic combined image from the processed image using the location information (hereinafter referred to as a fifth device in this section).

Further, a stereoscopic image processing device according to the present invention is a device for processing a received image, the device including an image processing portion for, when the received image is provided with information indicative of the fact that the image is a processed image constituted by a stereoscopic combined image formed by arranging a plurality of view-point images and an additional image contained in the stereoscopic combined image generated by superimposing the additional image onto the stereoscopic combined image at a non-center portion thereof and the received image is also provided with location information for use in extracting, from the processed image, the portion of the stereoscopic combined image which does not contain the additional image, extracting the portion of the stereoscopic combined image from the processed image using the location information (hereinafter referred to as a sixth device in this section).

In the fifth and sixth devices, the single stereoscopic combined image formed by arranging a plurality of view-point images may be a single stereoscopic combined image having a set of a right view-point image and a left view-point image which are arranged laterally. In these stereoscopic image processing devices, a stereoscopic image may be created using the respective view-point images in the stereoscopic combined image or the portion of the stereoscopic combined image which has been extracted. Further in these stereoscopic image processing devices, the respective view-point images in the stereoscopic combined image or the portion of the stereoscopic combined image which has been extracted may be displayed or printed out.

A program according to the present invention causes a computer to function as the means in the stereoscopic image processing device according to any one of the above described devices. Further, a recording medium according to the present invention is a computer-readable recording medium in which the above mentioned program is recorded.

Effect of the Invention

As described above, according to the present invention, there is provided an effect of, for example, preventing undesirable cutout of images as much as possible, when a stereoscopic combined image is, e.g., printed out. Further, according to the present invention, even when a padding area is added to a stereoscopic combined image, the apparatus which receives it can easily remove the padding area therefrom. Further, there is provided an effect of, for example, enabling extraction of only the portion of a stereoscopic combined image from a processed image constituted by a stereoscopic combined image and an additional image contained in the stereoscopic combined image generated by superimposing the additional image onto the stereoscopic combined image at a non-center portion thereof.

BEST MODE FOR CARRYING OUT THE INVENTION (First Embodiment)

Hereinafter, an embodiment of the present invention will be described with reference to FIGS. 1 to 3.

Figure 1:
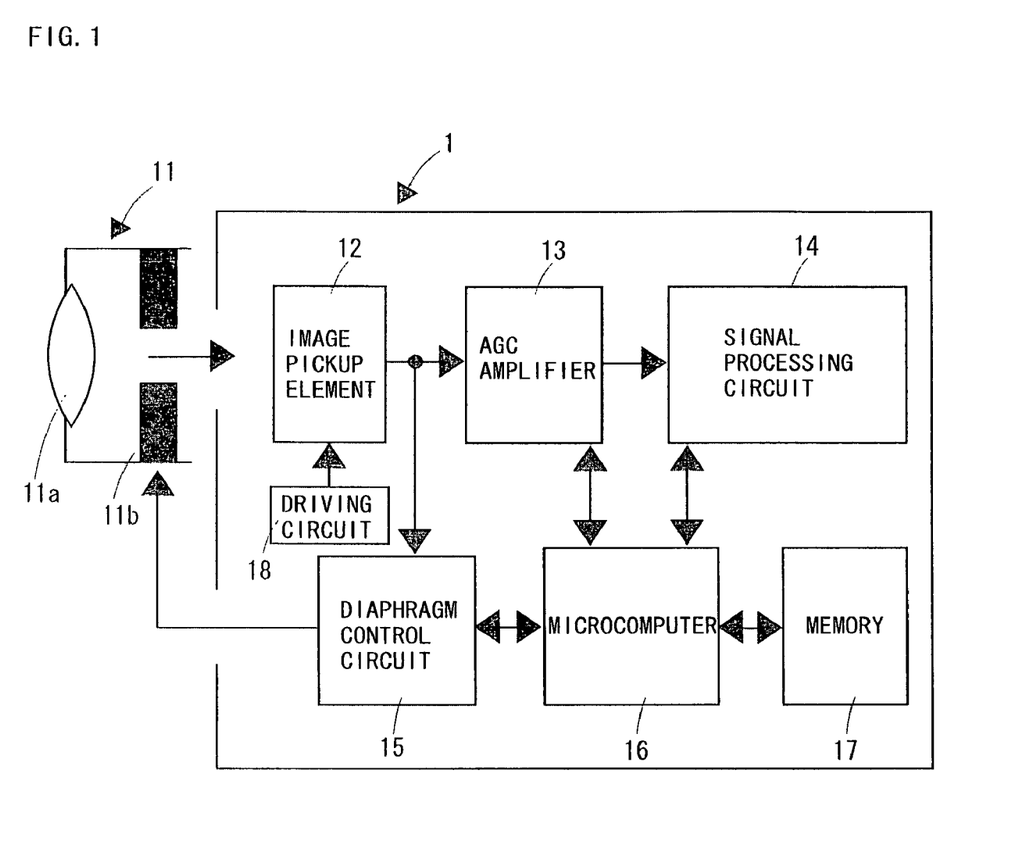
FIG. 1 is a schematic diagram illustrating a digital still camera as a stereoscopic image processing device according to the present invention.

FIG. 1 is a schematic diagram illustrating a digital still camera 1. The digital still camera 1 includes a lens mechanism 11 including a group of lenses 11a, a diaphragm portion 11b for diaphragm adjustment and so on. An image pickup element driving circuit 18 drives an image pickup element (for example, a CCD, a CMOS sensor) 12. The image pickup element 12 receives picture light of a subject which has been passed through the lens mechanism 11, then converts the picture light into an electric signal and outputs the electric signal. The image pickup element 12 has an aspect ratio of, for example, 4:3. A signal processing circuit 14 performs various types of signal processes on picture signals outputted from the image pickup element 12 and subjected to gain adjustment by an AGC (an auto gain controller) amplifier 13, and then outputs the picture signals to a camera monitor (not illustrated). Further, the signal processing circuit 14 converts, into image data, the picture signal outputted at the moment when a shutter (not illustrated) is pressed. A microcomputer 16 stores this image data in a memory 17. A diaphragm control circuit 15, to which output signals from the image pickup element 12 are inputted, performs feedback control on the diaphragm portion 11 such that the level of the picture signals from the image pickup element 12 becomes a predetermined level.

It is possible to create and record a stereoscopic combined image using the digital still camera 1. Such a stereoscopic combined image is created by arranging a plurality of view-point images and combining them into a single image. For example, a user selects "3D photographing" out of menu items and then photographs a desired subject. The data of the subject resulted from the first photographing is stored in the memory 17 as left view-point image data, for example. The digital still camera 1 displays a massage describing "Please photograph the same subject by slightly moving the camera rightward", for example, on the camera monitor. This massage prompts the user to photograph the same subject. The data of the subject resulted from the second photographing is stored in the memory 17 as right view-point image data.

Figure 2A:
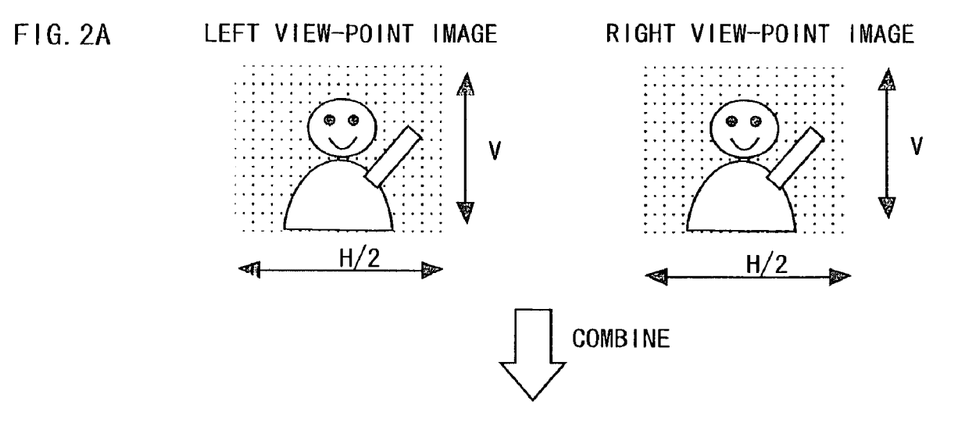
FIG. 2 is a schematic diagram illustrating a procedure for creating a stereoscopic combined image and a processed image.
Figure 2B:
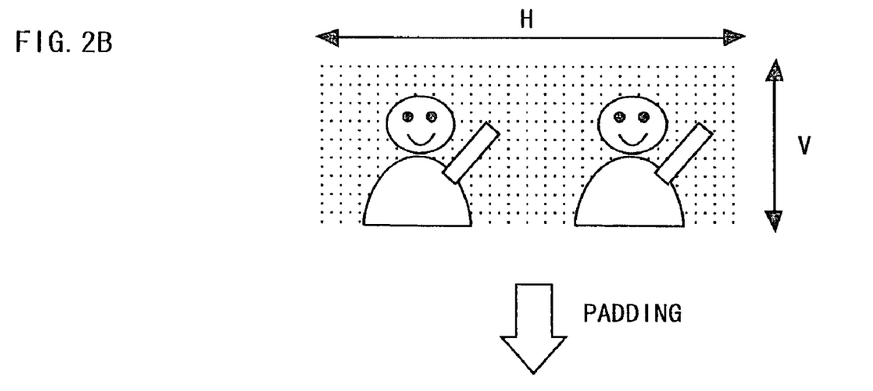

Through the aforementioned processing, as illustrated in FIG. 2A, the left view-point image data and the right view-point image data are stored in the memory 17. In this case, it is assumed that these images have an aspect ratio of H/2:V (for example, H/2:V is the aspect ratio of the image pickup element 12 (for example, 4:3)). The microcomputer 16, which recognizes that the data of these two images has been created in the "3D photographing" mode, arranges the left view-point image data and the right view-point image data in a lateral direction and combines them into a single image. Through this processing, as illustrated in FIG. 2B, original stereoscopic combined image data is created. This original stereoscopic combined image data has an aspect ratio of H:V. It is also possible to create a combined image as illustrated in FIG. 2B through a method of capturing right and left images at the same time, mounting a stereoscopic-image photographing adapter on the camera.

Figure 2C:
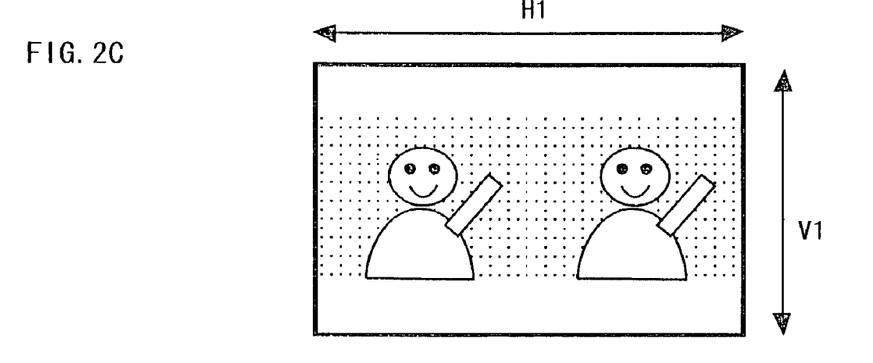

Next, the microcomputer 16 adds a padding area (dummy area) to the upper side and the lower side of the original stereoscopic combined image data. Namely, as illustrated in FIG. 2C, the microcomputer 16 creates a processed image which contains the original stereoscopic combined image. This processed image has an aspect ratio (H1:V1) of 4:3, for example.

Namely, the microcomputer 16 adds the padding area having any color to the original stereoscopic combined image such that the ratio between V1 and H1 becomes a predetermined ratio, assuming that the horizontal size and the vertical size of the original stereoscopic combined image are H and V, respectively, and the horizontal size and the vertical size of the processed image containing the stereoscopic combined image are H1 and V1, respectively. While, in the above example, the padding area is formed by gray-color data, it is also possible to use data of different colors.

In the above example, processing for making the aspect ratio (H1:V1) of the processed image to be a predetermined aspect ratio is performed, regardless of the value of the aspect ratio of the original stereoscopic combined image data. The present invention is not limited thereto, and a processed image can be created (the aspect ratio of the processed image may be the above predetermined aspect ratio) when the value of the aspect ratio of the original stereoscopic combined image data does not meet a predetermined value. For example, as illustrated in the flowchart of FIG. 3, at first, the left view-point image data and the right view-point image data are arranged laterally to create original stereoscopic combined image data (step S1).

Next, the horizontal size H and the vertical size V of the original stereoscopic combined image data are calculated (step S2). The unit of the horizontal size H and the vertical size V can be the number of pixels. Next, it is determined whether or not the condition of $V/H \geq 2/3$ is satisfied (step S3). When this condition is satisfied, the creation of a processed image is not performed. On the other hand, when the condition is not satisfied, calculation processing of $\Delta V = 2*H/3 - V$ is conducted (step S4). Then, padding areas having a width of $\Delta V/2$ are added to the upper side and the lower side of the original stereoscopic combined image data (step S5).

Namely, the padding areas having any color and any pattern are added to the original stereoscopic combined image such that the ratio between V1 and H1 becomes a predetermined ratio, in the case where the ratio between V and H does not satisfy a specified ratio, assuming that the horizontal size and the vertical size of the original stereoscopic combined image are H and V, respectively, and the horizontal size and the vertical size of the processed image containing the stereoscopic combined image are H1 and V1, respectively. The any color includes an achromatic color. While, in the above example, the padding areas are formed by uniform gray-color data, it is also possible to use data of different colors or data with patterns.

While the above exemplary processing adds padding areas such that the aspect ratio of the processed image becomes a predetermined ratio, the present invention is not limited thereto. Even when the aspect ratio of the processed image does not meet the predetermined ratio, even the addition of small padding areas to the upper and lower sides of the original stereoscopic combined image data contributes to increasing the stereoscopic area of the stereoscopic combined image by an amount corresponding to the added padding areas. Namely, padding areas having any color can be added to the original stereoscopic combined image such that the condition of V1>V is satisfied and also the condition that the ratio between V1 and H1 falls within a range around the predetermined ratio, assuming that the horizontal size and the vertical size of the original stereoscopic combined image are H and V, respectively, and the horizontal size and the vertical size of the processed image containing the stereoscopic combined image are H1 and V1, respectively. In this processing also, the padding areas can be added when the ratio between V and H does not satisfy the specified ratio.

With reference to FIG. 9 which has been previously referred to, description will be further provided. In general printing services, for example, paper sheets having the sizes with horizontal-to-vertical ratios of 119:89 (an aspect ratio of 4:3=1.33:1), 127:89 (an aspect ratio of 1.43:1) and the like are used. In the case where an original image has an aspect ratio different from that of the paper sheet, processing for printing the original image on the paper sheet as follows is performed in many cases. That is, the size of the paper sheet is matched with the size of the original image on the basis of the relatively-shorter length out of the vertical and horizontal lengths of the original image, in order to prevent the occurrence of "short" of the image in the paper sheet. This causes the image to protrude from the paper sheet in the direction of the relatively-greater length of the original image, which causes the original image to be subjected to trimming. Further, some home printers perform similar processing in the case where a mode in which images are matched with paper sheets is specified. In order to provide a desirable image for stereoscopic viewing, it is preferable to provide a greater common visual-field area (stereoscopic visual-field area) between the left view-point image data and the right view-point image data which constitute the stereoscopic combined image. However, when the stereoscopic combined image (original image) is subjected to trimming as described above to generate an unusable area within the left view-point image or the right view-point image thereby failing to obtain a sufficient common visual-field area, this may result in a useless print which is unusable for stereoscopic viewing.

By adding padding areas to the original stereoscopic combined image data (namely, by creating a processed image) as described above, it is possible to prevent the image from being subjected to trimming through the aforementioned processing as much as possible, even when the processed image is brought to a printing laboratory and the like. Namely, it is possible to prevent the image from being printed out in such a way that the image becomes useless and unusable for stereoscopic viewing.

In order to provide a desirable image for stereoscopic viewing, it is desirable that no trimming occurs, namely the rate of the common visual-field area (the stereoscopic visual-field area) between both the view-point images is 100%, but it is not necessary that the rate is 100%. Provided that there is secured a certain amount of common visual-field area (stereoscopic visual-field area) between both the view-point images, it is possible to employ the processing which does not involve the creation of processed image, as illustrated in the flowchart of FIG. 3.

Figure 3:
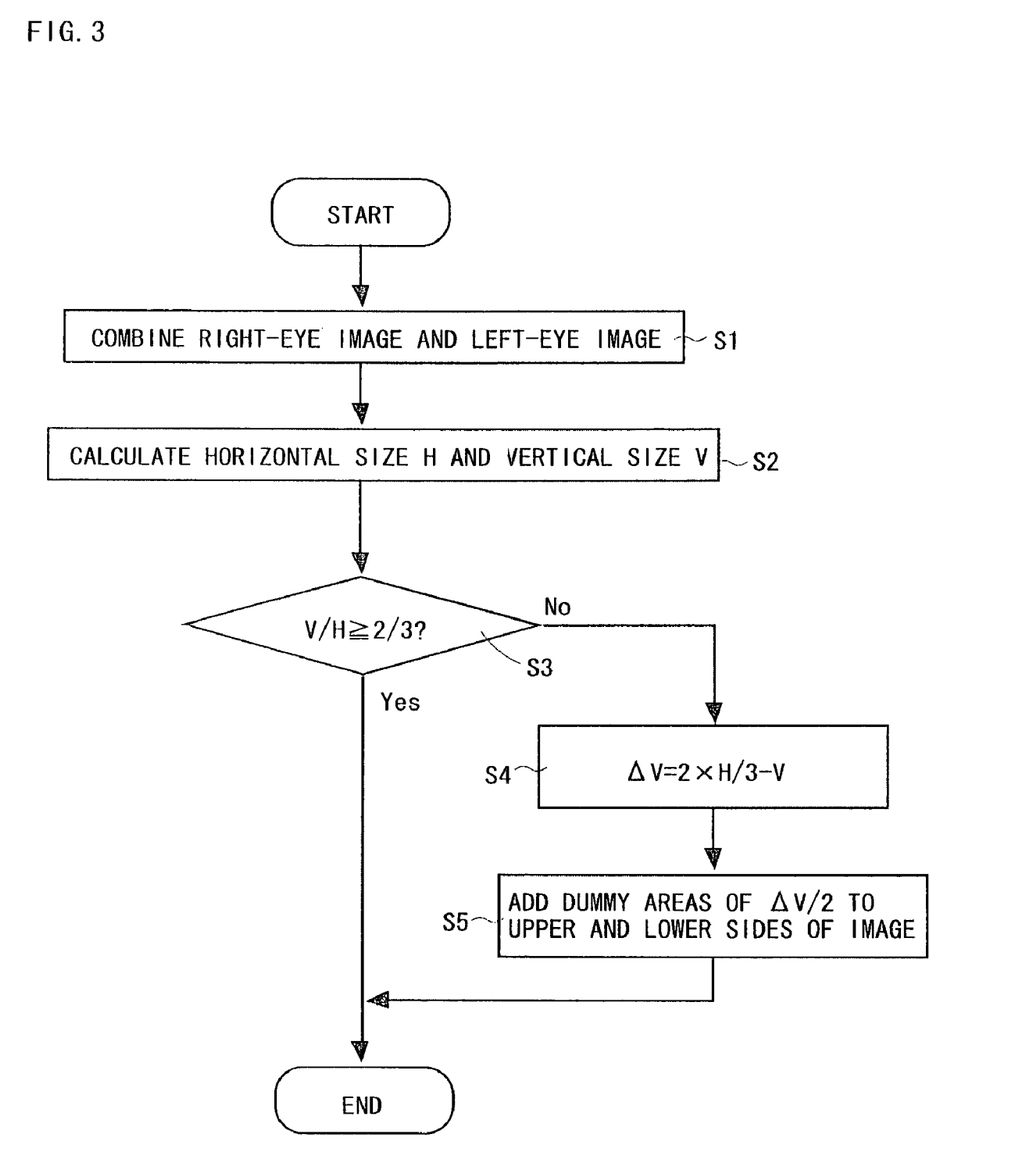
FIG. 3 is a flowchart illustrating the procedure for creating a stereoscopic combined image and a processed image.

The condition "V/H≧2/3" illustrated in the flowchart of FIG. 3 is a determination condition which enables the rate of the common visual-field area (the stereoscopic visual-field area) to be 77%, even in the worst case (in the case where the ratio of the longer side length of the paper sheet to the shorter side length thereof is 1.33). As a matter of course, the condition that the rate of the common visual-field area (stereoscopic visual-field area) is 77% is one embodiment, but the present invention is not limited thereto. Further, in the above described embodiment, there has been described a case where the number of view point is two. In the case of two-view-point images, there have been widespread applications (known stereo viewers, stereoscopic image viewing utilizing Direct Viewing Schemes such as a parallel method and a cross method) which directly use images outputted from displays and printers and, therefore, it goes without saying that there are significant challenges and effects therefor of the present invention for two-view-point images. In the case of images having any number n (n>2) of view points, similarly, the present invention is significantly effective. As an example, there will be studied a using method in which a combined image having n view points is directly outputted for checking the condition of photographing of the entire stereoscopic image (for example, for checking if only a partial view point is obstructed by a hand or cloth during photographing using a multi-lens camera). When the aspect ratio of the combined image does not match with the aspect ratio of the output apparatus, this causes a problem of partial missing of images at partial view points, which makes it impossible to check the condition of photographing. The present invention is effective to cope with such a problem.

Further, while, in the above example, a digital still camera is taken as an example of the stereoscopic image processing device, the present invention is not limited thereto. For example, a personal computer connected to a scanner can be used as the stereoscopic image processing device. The driver software for the scanner is installed in the personal computer. Further, a button such as a "3D" button is provided in a screen for activating the software for the scanner. The user operates the "3D" button, then sets, e.g., a photograph as a left view-point image and operates the scanner. After this first operation, the user sets a photograph as a right view-point image and then operates the scanner. The two image data resulted from the two scanning operations are stored in a memory of the personal computer, as left view-point image data and right view-point image data. Through this processing, the left view-point image data and the right-view point image data are stored in the memory as illustrated in FIG. 2A and, thereafter, the processing illustrated in FIGS. 2B and 2C can be conducted by the personal computer. The processed image created by this processing may either be displayed on the monitor of the personal computer or may be supplied to a printer (not illustrated).

When the personal computer is placed in an environment where it can be connected to a network, it is possible to download left view-point image data and right view-point image data to the personal computer from a certain server (website). Through this downloading, the left view-point image data and the right view-point image data are stored in the memory of the personal computer as illustrated in FIG. 2A and, thereafter, the processing illustrated in FIGS. 2B and 2C can be conducted by the personal computer. The processed image created by this processing may either be displayed on the monitor of the personal computer or may be supplied to a printer (not illustrated).

A program (software) for causing the personal computer to perform the processing illustrated in FIGS. 2B and 2C may either be downloaded to the personal computer through a network or may be read by the personal computer from a CD-ROM storing the program.

Further, in the case of a reduced image indicating the content of a file, such as a thumbnail image, similarly it is desirable that the reduced image can be stereoscopically viewed by itself while enabling accurate recognition of the content of the file in a non-trimmed state. Such a reduced image has an aspect ratio of 1:1 in many cases, and therefore, it is preferable to apply padding thereto such that this aspect ratio is satisfied.

(Second Embodiment)

Figure 4A:
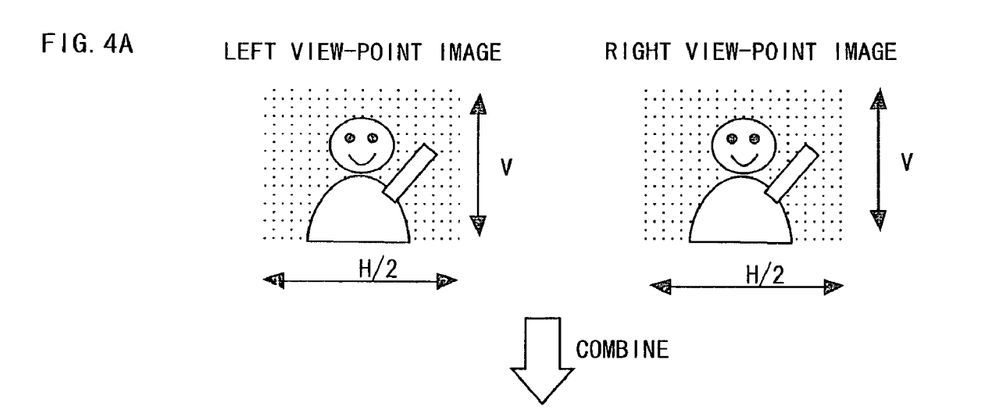
FIG. 4 is a schematic diagram illustrating a procedure for creating a stereoscopic combined image and a processed image.
Figure 4B:
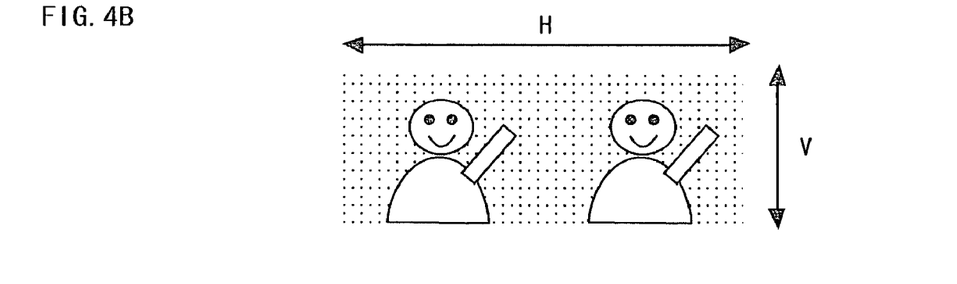
Figure 4C:
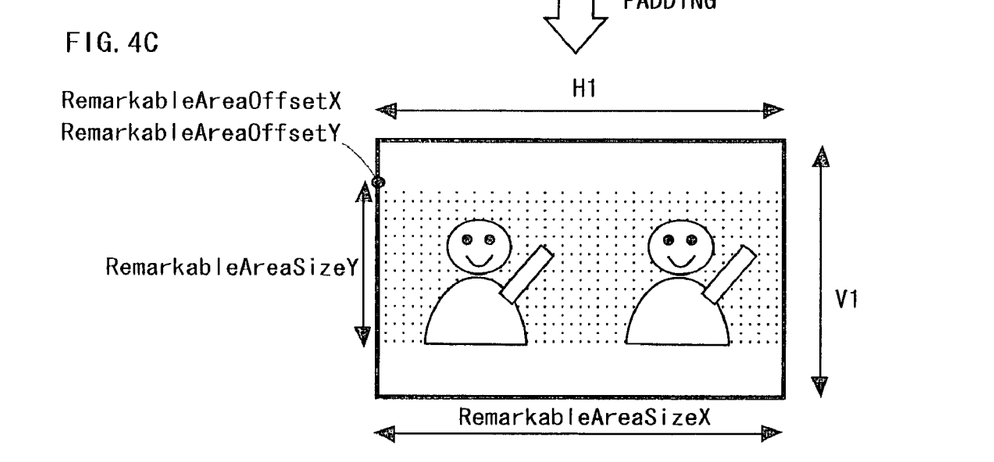

Hereinafter, with reference to FIGS. 4 to 8, there will be described an embodiment of the present invention, wherein the addition of padding areas is the same as described in the first embodiment. For example, using the digital still camera of FIG. 1, left view-point image data and right view-point image data are created, as illustrated in FIG. 4A. The microcomputer in the digital still camera arranges the left view-point image data and the right view-point image data laterally and combines them into a single image. Through this processing, original stereoscopic combined image data is created, as illustrated in FIG. 4B. The microcomputer adds padding areas (dummy areas) to the upper side and the lower side of the original stereoscopic combined image data. Namely, as illustrated in FIG. 4C, a processed image containing the original stereoscopic combined image is created. This processed image has an aspect ratio (H1:V1) of 4:3, for example. Further, the microcomputer creates location information for use in extracting the stereoscopic combined image from the processed image and adds this location information to the processed image. Any color including achromatic colors (white, black and gray) and any pattern can be used for the padding.

Figure 6:
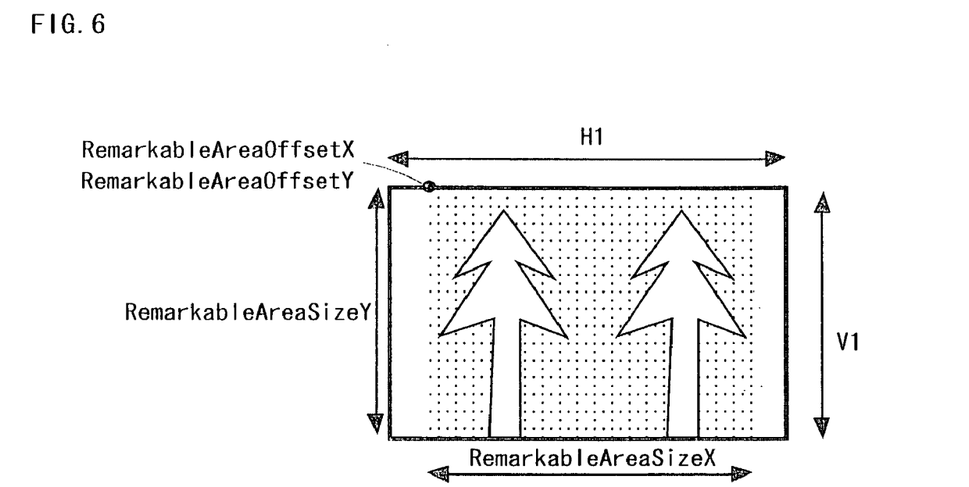
FIG. 6 is a schematic diagram illustrating another exemplary processed image.

The location information includes information about the horizontal size (Remarkable Area Size X) and the vertical size (Remarkable Area Size Y) of the original stereoscopic combined image, and information about the coordinates (Remarkable Area Offset X, Remarkable Area Offset Y) of the upper left corner of the original stereoscopic combined image on a basis of the upper left corner of the processed image. This information can be expressed by the number of pixels. As illustrated in FIG. 6, padding areas (dummy areas) can also be added to the left side and the right side of the original stereoscopic combined image data to create a processed image.

Figure 7:
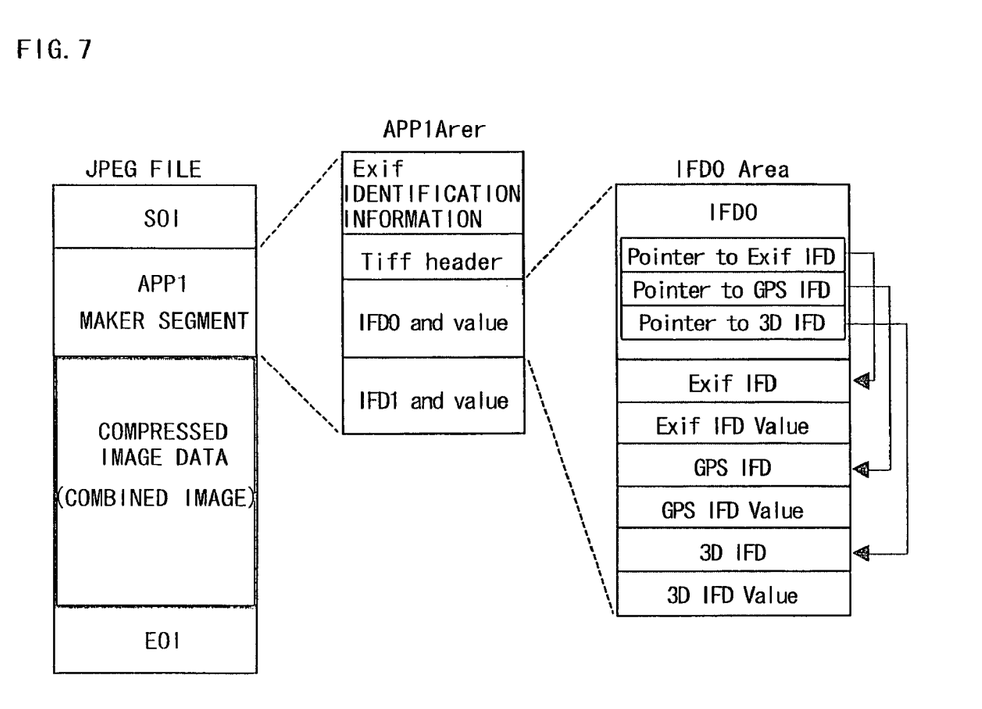
FIG. 7 is a schematic diagram illustrating an exemplary addition of location information.

There will be exemplified a case where the processed image is JPEG data. The format structure thereof is illustrated in FIG. 7. This exemplary format conforms to the Exif standard. The Exif standard is an image file format for digital still cameras. The JPEG file format defines an area of application marker segment (APP) in which specific information can be stored. The Exif file format stores, in the APP, specific information (information about photographing conditions and the like, information obtained from the global positioning system, and the like).

In the present embodiment, the location information is stored in the APP1. There are various types of tags used in the 0th and 1st IFDs and, in FIG. 7, there are represented "Pointer to Exif IFD", "Pointer to GPS IFD" and "Pointer to 3D IFD". The "Pointer to Exif IFD" is a pointer to an Exif IFD, and the Exif IFD exists at the position specified by the "Pointer to Exif IFD". Exemplary tags used in the Exif IFD include tags for diaphragm and shutter speed. The "Pointer to GPS IFD" is a pointer to a GPS IFD, and the GPS IFD exists at the position specified by the "Pointer to GPS IFD". In this GPS IFD, measurement information acquired from the global positioning system (GPS) is stored. Similarly, the "Pointer to 3D IFD" is a pointer to a 3D IFD, and the 3D IFD exists at the position specified by the "Pointer to 3D IFD". In this 3D IFD, the location information is stored. In addition to the location information, it is also possible to add information about the stereoscopic viewing method such as information about whether the stereoscopic viewing method is the cross method or the parallel method, information indicative of the fact that the image is a stereoscopic image, information indicative of the number of view points, and the like.

The addition of these pieces of information enables the device to determine easily whether each image is a right view-point image or a left view-point image or whether each image is a first view-point image or a second view-point image or a third view-point image. Here, as information indicative of the fact that the image is a processed image created by adding at least a single padding area having any color and any pattern to a single stereoscopic combined image formed by arranging a plurality of view-point images, it is possible to add, specifically, information (dedicated information) indicative of the fact. However, the present invention is not limited thereto and, for example, it is also possible to utilize the location information as such information (the location information can serve as such information). Namely, when the receiving side is able to acquire the location information (and other information), the receiving side may determine that the received image is the processed image, even when the "information specifically indicative of the fact" is not added (even when the receiving side cannot acquire the information).

Figure 5:
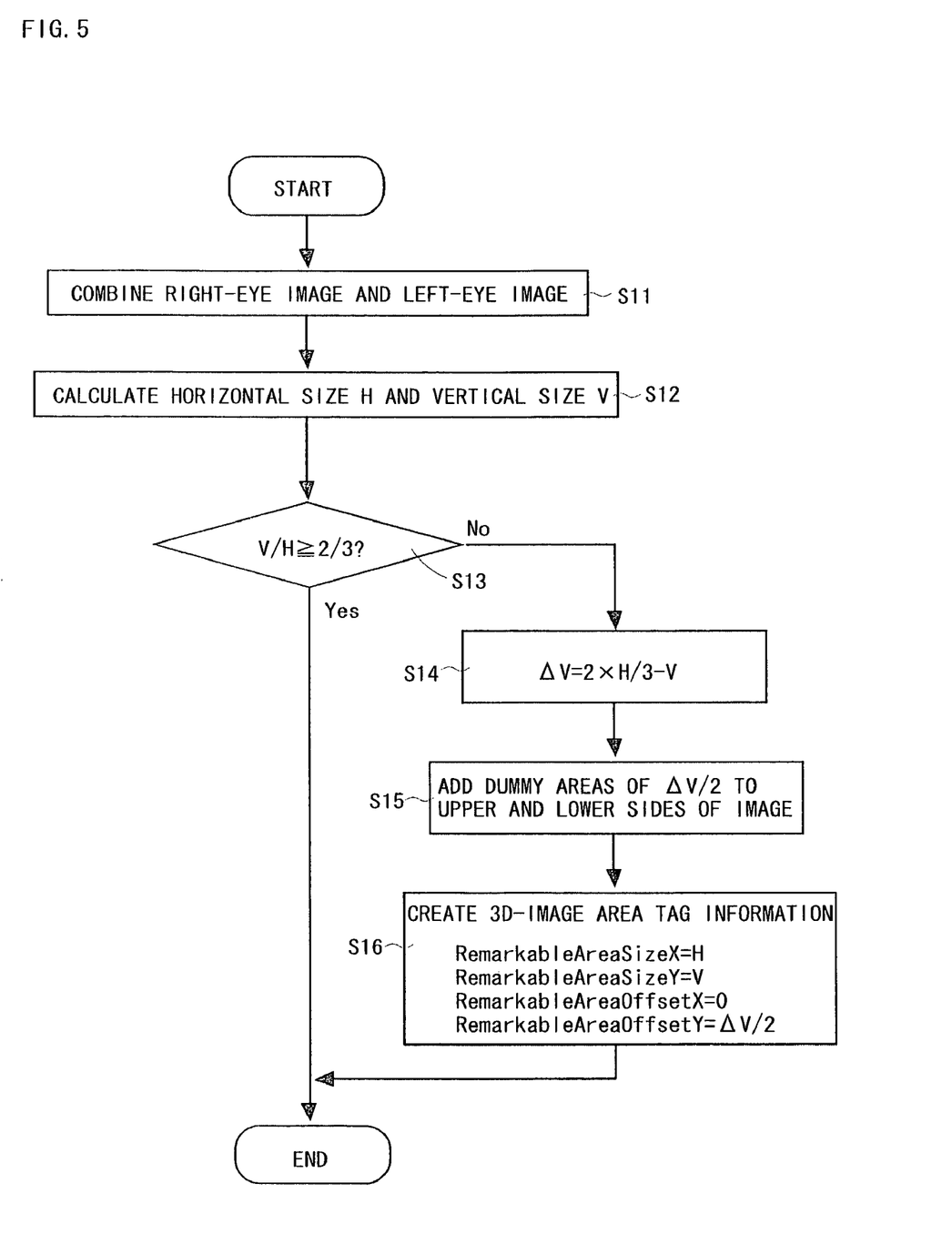
FIG. 5 is a flowchart illustrating the procedure for creating a stereoscopic combined image and a processed image.

In the above example, processing for making the aspect ratio (H1:V1) of the processed image to be a predetermined aspect ratio is performed, regardless of the value of the aspect ratio of the original stereoscopic combined image data. The present invention is not limited thereto, and a processed image can be created (the aspect ratio of the processed image may be the predetermined aspect ratio), when the value of the aspect ratio of the original stereoscopic combined image data does not meet the predetermined value. For example, as illustrated in the flowchart of FIG. 5, at first, a left view-point image data and a right view-point image data are arranged laterally to create an original stereoscopic combined image data (step S11).

Next, the horizontal size H and the vertical size V of the original stereoscopic combined image data are calculated (step S12). The unit of the horizontal size H and the vertical size V may be the number of pixels. Then, it is determined that the condition of $V/H \geqq 2/3$ is satisfied (step S13). When this condition is satisfied, no processed image is created. On the other hand, when the condition is not satisfied, calculation processing of $\Delta V = 2*H/3 - V$ is conducted (step S14). Then, padding areas having a width of $\Delta V/2$ are added to the upper side and the lower side of the original stereoscopic combined image data (step S15). Further, the location information for use in extracting the stereoscopic combined image from the processed image is created and the location information is added to the processed image (step S16).

While, in the above described exemplary processing, the padding areas are added such that the aspect ratio of the processed image becomes a predetermined ratio, the present invention is not limited thereto. As in the first embodiment, even the addition of small padding areas to the upper and lower sides of the original stereoscopic combined image data contributes to increasing the stereoscopic visual-field area of the stereoscopic combined image by an amount corresponding to the added padding areas, even though the aspect ratio of the processed image does not meet the predetermined ratio. Further, a digital still camera is taken as an example of the stereoscopic image processing device for adding the location information, the present invention is not limited thereto. As in the first embodiment, for example, a personal computer connected to a scanner can be used as the stereoscopic image processing device. The two image data resulted from the two scanning operations are stored in the memory in the personal computer as left view-point image data and right view-point image data. Through this processing, the left view-point image data and the right view-point image data are stored in the memory as illustrated in FIG. 4A and, thereafter, the personal computer may perform the processing illustrated in FIGS. 4B and 4C and the adding of location information.

Further, as in the first embodiment, when the personal computer is placed in an environment where it can be connected to a network, it is possible to download left view-point image data and right view-point image data to the personal computer from a certain server (website). Through the downloading, the left view-point image data and the right viewpoint image data are stored in the memory in the personal computer as illustrated in FIG. 4A and, thereafter, the personal computer may perform the processing illustrated in FIGS. 4B and 4C and the addition of location information.

A program (software) for causing the personal computer to perform the processing illustrated in FIGS. 4B and 4C and the adding of location information can be downloaded to the personal computer through a network or can be read by the personal computer from a CD-ROM storing the program. In the case where the digital still camera has the function of being connected to a network (for example, in the case of a cellar phone equipped with the function of a digital still camera), similarly, the program (software) for causing the digital still camera to perform the processing illustrated in FIGS. 4B and 4C and the adding of location information can be downloaded thereto through a network.

Figure 8A:
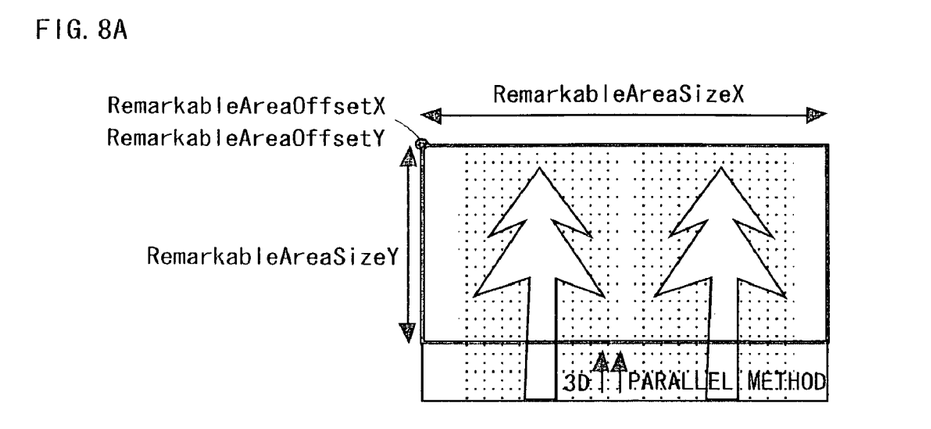
FIG. 8 is a schematic diagram illustrating an exemplary addition of location information.
Figure 8B:
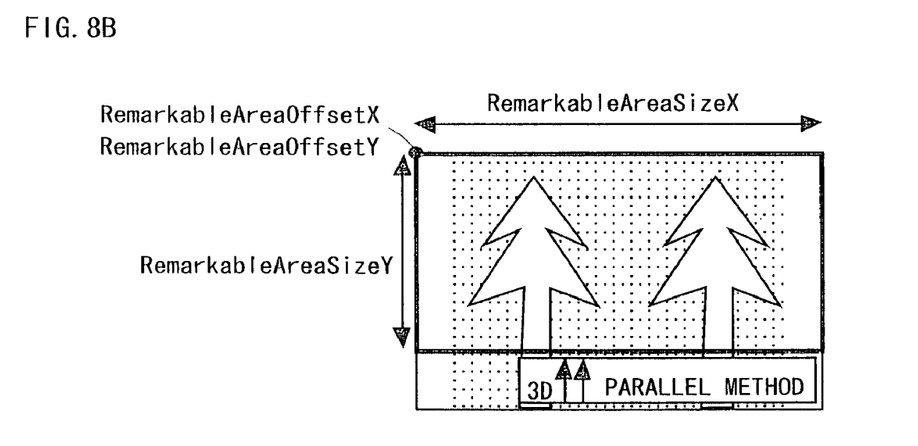
Figure 8C:
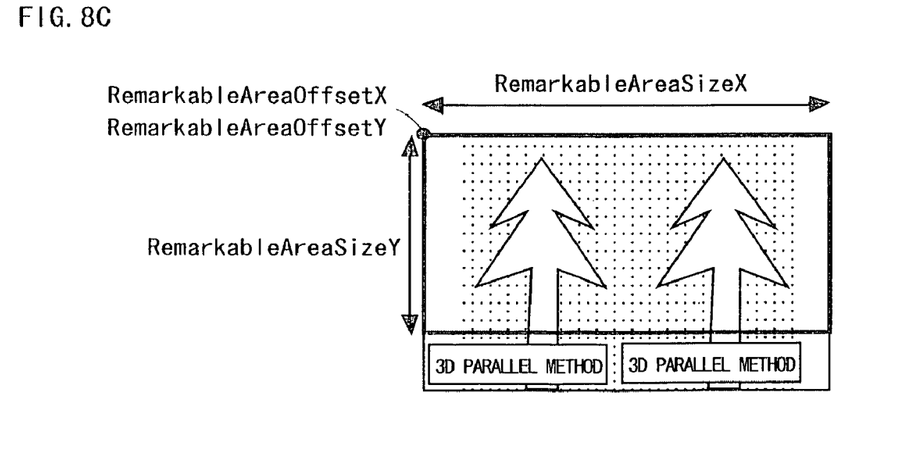

FIGS. 8A, 8B and 8C illustrate other exemplary processed images. These processed images are created by superimposing an additional image on a stereoscopic combined image at a non-center portion thereof (near the lower edge in the figures), so that the stereoscopic combined image contains the additional image. The additional image can be superimposed such that the pixel value of this additional image is 100% or such that the pixel value of the stereoscopic combined image is 50% and the pixel value of the additional image is 50% (the latter case enables translucent superimposition). The stereoscopic combined image is created by arranging a right viewpoint image and a left view-point image laterally and combining them into a single image. For example, the stereoscopic combined image can be created by capturing left and right images at the same time using a stereoscopic-image photographing adapter mounted to the camera. The additional image is an image constituted by a character and/or a symbol indicating that the stereoscopic combined image is a stereoscopic image ("3D" in the examples of the figures) or an image constituted by a character and/or a symbol indicating the stereoscopic viewing method for the stereoscopic combined image ("↑↑" and "Parallel Method", in the examples of the figures). The symbol includes an icon.

Location information is also added to the processed image according to the method which has been previously described. The location information is information usable for extracting the portion of the stereoscopic combined image which does not contain the additional image from the processed image. Further, the location information is information about the horizontal size (Remarkable Area Size X) of the original stereoscopic combined image, the vertical size for extracting (Remarkable Area Size Y) which is smaller than the vertical size of the original stereoscopic combined image, and the coordinates (Remarkable Area Offset X, Remarkable Area Offset Y) of the upper left corner of the original stereoscopic combined image on a basis of the upper left corner of the processed image. The difference between the original vertical size and the vertical size for extracting is made slightly greater than the vertical size of the additional image. Further, in the case of superimposing the additional image on the stereoscopic combined image at a position near the upper edge, it is possible to set the value of the coordinate information (Remarkable Area Offset X, Remarkable Area Offset Y) to a proper value or to use a method for setting the coordinate information on a basis of the lower left corner of the stereoscopic combined image. It is also possible to add, to the processed image, information indicative of whether the coordinate information is set on a basis of the upper left corner or the lower left corner of the stereoscopic combined image.

In the case where the additional image exists near a right edge or a left edge of the stereoscopic combined image, the horizontal size for extracting is made smaller than the horizontal size of the original stereoscopic combined image. As the information indicative of the fact that the image is a processed image created by superimposing an additional image on a single stereoscopic combined image formed by arranging a plurality of view-point images at a non-center portion thereof such that the stereoscopic combined image contains the additional image, it is possible to add, specifically, information (dedicated information) indicative of the fact. However, the present invention is not limited thereto and, for example, it is also possible to utilize the location information as such information (the location information can serve as such information). Namely, when the receiving side is able to acquire the location information (and other information), the receiving side can determine that the received image is the processed image, even when the "information specifically indicative of the fact" is not added (even when the receiving side cannot acquire the information).

[Removal of Padding Areas/Additional Images]

A printer which is not capable of recognizing the location information will directly print out the processed image, without recognizing the location information. Further, a 3D display apparatus which is not capable of recognizing the location information (for example, a personal computer, a digital still camera, a digital broadcasting receiving apparatus, a cellular phone or the like which is capable of 3D displaying) will create a stereoscopic image based on the processed image, without recognizing the location information.

On the other hand, a printer or a 3D display apparatus which is structured to be capable of recognizing the location information (for example, a personal computer, a digital still camera, a digital broadcasting receiving apparatus, a cellular phone or the like which is capable of 3D displaying) can extract the original stereoscopic combined image data from the processed image, on the basis of the location information. Further, such a printer or a 3D display apparatus can extract the portion of the stereoscopic combined image which does not contain the additional image from the processed image, on the basis of the location information. Further, such a printer or a 3D display apparatus can vertically divide the extracted stereoscopic combined image data at the center position in the horizontal direction to create a left view-point image and a right view-point image. Here, such a printer or a 3D display apparatus may divide the extracted stereoscopic combined image data into two images when there is no information about the number of view points, and may divide the image into the number of images corresponding to the number of view points when there is information about the number of view points.

A printer which is structured to be capable of recognizing the location information can print out the respective view-point images extracted from the processed image. A 3D-display apparatus which is structured to be capable of recognizing the location information can create a stereoscopic image using the respective view-point images extracted from the processed image. For example, in the case of employing a barrier system for stereoscopic viewing (a parallax barrier or the like is placed in the front surface of the monitor), the personal computer displays the left view-point image and the right view-point image in a spatially-alternate manner, on the monitor, for example, in a vertical stripe shape. In the case of employing shutter-glasses system for stereoscopic viewing, the personal computer displays, on the monitor, the left viewpoint image and the right view-point image in a temporally-alternate manner, in synchronous with the shutter operation of the shutter glasses.

The invention claimed is:

1. A stereoscopic image processing method for creating a single processed stereoscopic combined image formed by arranging a plurality of view-point images, the method comprising:
   determining whether a ratio V/H between a vertical size V and a horizontal size H of an original stereoscopic combined image satisfies a condition V/H ≦2/3; and
   upon determining that the ratio between the vertical size V and the horizontal size H of the original stereoscopic combined image does not satisfy the condition, adding a padding area having at least one of any color and any pattern to the original stereoscopic combined image to create the processed stereoscopic combined image with a horizontal size H1 and a vertical size V1,
   wherein the padding area is added to the original stereoscopic combined image in such a way as to satisfy the condition of V1>V and also to satisfy the condition that the ratio between V1 and H1 falls within a predetermined ratio range.

2. A stereoscopic image processing method for creating a single processed stereoscopic combined image formed by arranging a plurality of view-point images, the method comprising:
   determining whether a ratio V/H between a vertical size V and a horizontal size H of an original stereoscopic combined image satisfies a condition V/H ≦2/3; and
   upon determining that the ratio between the vertical size V and the horizontal size H of the original stereoscopic combined image does not satisfy the condition, adding a padding area having at least one of any color and any pattern to the original stereoscopic combined image to create the processed stereoscopic combined image with a horizontal size H1 and a vertical size V1,
   wherein the padding area is added to the original stereoscopic combined image such that the ratio between V1 and H1 becomes a predetermined ratio.

3. The stereoscopic image processing method according to claim 1 or 2, wherein the single processed stereoscopic combined image formed by arranging a plurality of view-point images is a single processed stereoscopic combined image having a set of a right view-point image and a left view-point image which are arranged laterally.

4. The stereoscopic image processing method according to claim 1 or 2, wherein the predetermined ratio is equal to or substantially equal to the ratio between the vertical size and the horizontal size of a printing sheet.

5. The stereoscopic image processing method according to claim 1 or 2, wherein the predetermined ratio is equal to or substantially equal to the ratio between the vertical size and the horizontal size of a display.

6. A stereoscopic image processing device for creating a single processed stereoscopic combined image formed by arranging a plurality of view-point images, the device comprising:
   a first processing portion for determining whether a ratio V/H between a vertical size V and a horizontal size H of an original stereoscopic combined image satisfies a condition V/H ≦2/3; and
   an image processing portion for, upon determining that the ratio between the vertical size V and the horizontal size H of the original stereoscopic combined image does not satisfy the condition, adding a padding area having at least one of any color and any pattern to the original stereoscopic combined image to create the processed stereoscopic combined image with a horizontal size H1 and a vertical size V1,
   wherein the padding area is added to the original stereoscopic combined image in such a way as to satisfy the condition of V1>V and also to satisfy the condition that the ratio between V1 and H1 falls within a range around a predetermined ratio.

7. A stereoscopic image processing device for creating a single processed stereoscopic combined image formed by arranging a plurality of view-point images, the device comprising:
   a first processing portion for determining whether a ratio V/H between a vertical size V and a horizontal size H of an original stereoscopic combined image satisfies a condition V/H ≦2/3; and
   an image processing portion for, upon determining that the ratio between the vertical size V and the horizontal size H of the original stereoscopic combined image does not satisfy the condition, adding a padding area having at least one of any color and any pattern to the original stereoscopic combined image to create the processed stereoscopic combined image with a horizontal size H1 and a vertical size V1,
   wherein the padding area is added to the original stereoscopic combined image such that the ratio between V1 and H1 becomes a predetermined ratio.

8. The stereoscopic image processing device according to claim 6 or 7, wherein the single processed stereoscopic combined image formed by arranging a plurality of view-point images is a single processed stereoscopic combined image having a set of a right view-point image and a left view-point image which are arranged laterally.

9. The stereoscopic image processing device according to claim 6 or 7, wherein the predetermined ratio is equal to or substantially equal to the ratio between the vertical size and the horizontal size of a printing sheet.

10. The stereoscopic image processing device according to claim 6 or 7, wherein the predetermined ratio is equal to or substantially equal to the ratio between the vertical size and the horizontal size of a display.

11. A non-transitory computer-readable recording medium having recorded thereon a program for causing a processor to perform the functions of the processing unit and the image processing portion of the stereoscopic image processing device according to claim 6 or 7.

12. A stereoscopic image processing method for creating a single processed stereoscopic combined image formed by arranging a plurality of view-point images, the method comprising the steps of:
   (a) determining whether a ratio V/H between a vertical size V and a horizontal size H of an original stereoscopic combined image satisfies a condition V/H ≦2/3;
   (b) upon determining that the ratio between the vertical size V and the horizontal size H of the original stereoscopic combined image does not satisfy the condition, adding a padding area having at least one of any color and any pattern to the original stereoscopic combined image to create the processed stereoscopic combined image containing the original stereoscopic combined image;
   (c) creating location information for use in extracting the original stereoscopic combined image from the processed stereoscopic combined image; and
   (d) adding the location information to the processed stereoscopic combined image.

13. A stereoscopic image processing method for creating a single processed stereoscopic combined image formed by arranging a plurality of view-point images, the method comprising the steps of:
- (a) determining whether a ratio V/H between a vertical size V and a horizontal size H of an original stereoscopic combined image satisfies a condition V/H $\leq 2/3$;
- (b) upon determining that the ratio between the vertical size V and the horizontal size H of the original stereoscopic combined image does not satisfy the condition, superimposing an additional image on a non-center portion of the original stereoscopic combined image to create a processed stereoscopic combined image including the original stereoscopic combined image and the additional image contained in the original stereoscopic combined image;
- (c) creating location information for use in extracting, from the processed stereoscopic combined image, the portion of the original stereoscopic combined image which does not contain the additional image; and
- (d) adding the location information to the processed stereoscopic combined image.

14. The stereoscopic image processing method according to claim 13, wherein the additional image is an image having at least one of a character and a symbol indicating the fact that the processed stereoscopic combined image is a stereoscopic image.

15. The stereoscopic image processing method according to claim 13, wherein the additional image is an image having at least one of a character and a symbol indicating a method for stereoscopically viewing the processed stereoscopic combined image.

16. The stereoscopic image processing method according to any one of claims 12 to 15, wherein the single processed stereoscopic combined image formed by arranging a plurality of view-point images is a single processed stereoscopic combined image having a set of a right view-point image and a left view-point image which are arranged laterally.

17. A stereoscopic image processing device for creating a single processed stereoscopic combined image formed by arranging a plurality of view-point images, the device comprising:
- a first processing portion for determining whether a ratio V/H between a vertical size V and a horizontal size H of an original stereoscopic combined image satisfies a condition V/H $\leq 2/3$;
- a second processing portion for, upon determining that the ratio between the vertical size V and the horizontal size H of the original stereoscopic combined image does not satisfy the condition, adding a padding area having at least one of any color and any pattern to the original stereoscopic combined image to create the processed stereoscopic combined image containing the original stereoscopic combined image;
- a third processing portion for creating location information for use in extracting the original stereoscopic combined image from the processed stereoscopic combined image; and
- a fourth processing portion for adding the location information to the processed stereoscopic combined image.

18. A stereoscopic image processing device for creating a single processed stereoscopic combined image formed by arranging a plurality of view-point images, the device comprising:
- a first processing portion for determining whether a ratio V/H between a vertical size V and a horizontal size H of an original stereoscopic combined image satisfies a condition V/H $\leq 2/3$;
- a second processing portion for, upon determining that the ratio between the vertical size V and the horizontal size H of the original stereoscopic combined image does not satisfy the condition, superimposing an additional image on a non-center portion of the original stereoscopic combined image to create a processed stereoscopic combined image including the original stereoscopic combined image and the additional image contained in the original stereoscopic combined image;
- a third processing portion for creating location information for use in extracting, from the processed stereoscopic combined image, the portion of the original stereoscopic combined image which does not contain the additional image; and
- a fourth processing portion for adding the location information to the processed stereoscopic combined image.

19. The stereoscopic image processing device according to claim 18, wherein the additional image is an image having at least one of a character and a symbol indicating the fact that the processed stereoscopic combined image is a stereoscopic image.

20. The stereoscopic image processing device according to claim 18, wherein the additional image is an image having at least one of a character and a symbol indicating a method for stereoscopically viewing the processed stereoscopic combined image.

21. The stereoscopic image processing device according to any one of claims 17 to 20, wherein the single processed stereoscopic combined image formed by arranging a plurality of view-point images is a single processed stereoscopic combined image having a set of a right view-point image and a left view-point image which are arranged laterally.

22. A non-transitory computer-readable recording medium having recorded thereon a program for causing a processor to perform the functions of the first, second, third, and fourth processing portions of the stereoscopic image processing device according to any one of claims 17 to 20.

* * * * *